(No Model.)

D. W. CURTIS.
MILK TESTER.

No. 537,106. Patented Apr. 9, 1895.

Witnesses
Cele Bundure
E. B. Bull

David W. Curtis, Inventor:
by Dodge & Sons,
Attorneys.

UNITED STATES PATENT OFFICE.

DAVID W. CURTIS, OF FORT ATKINSON, WISCONSIN.

MILK-TESTER.

SPECIFICATION forming part of Letters Patent No. 537,106, dated April 9, 1895.

Application filed January 8, 1895. Serial No. 534,243. (No model.)

*To all whom it may concern:*

Be it known that I, DAVID W. CURTIS, a citizen of the United States, residing at Fort Atkinson, in the county of Jefferson and State of Wisconsin, have invented certain new and useful Improvements in Milk-Testers, of which the following is a specification.

My invention relates to that class of machines or devices known as "milk testers," and the invention consists in a novel construction of the apparatus whereby it is operated or driven by steam, and the milk being tested is at the same time heated by the escape steam, all as hereinafter more fully set forth.

Figure 1:
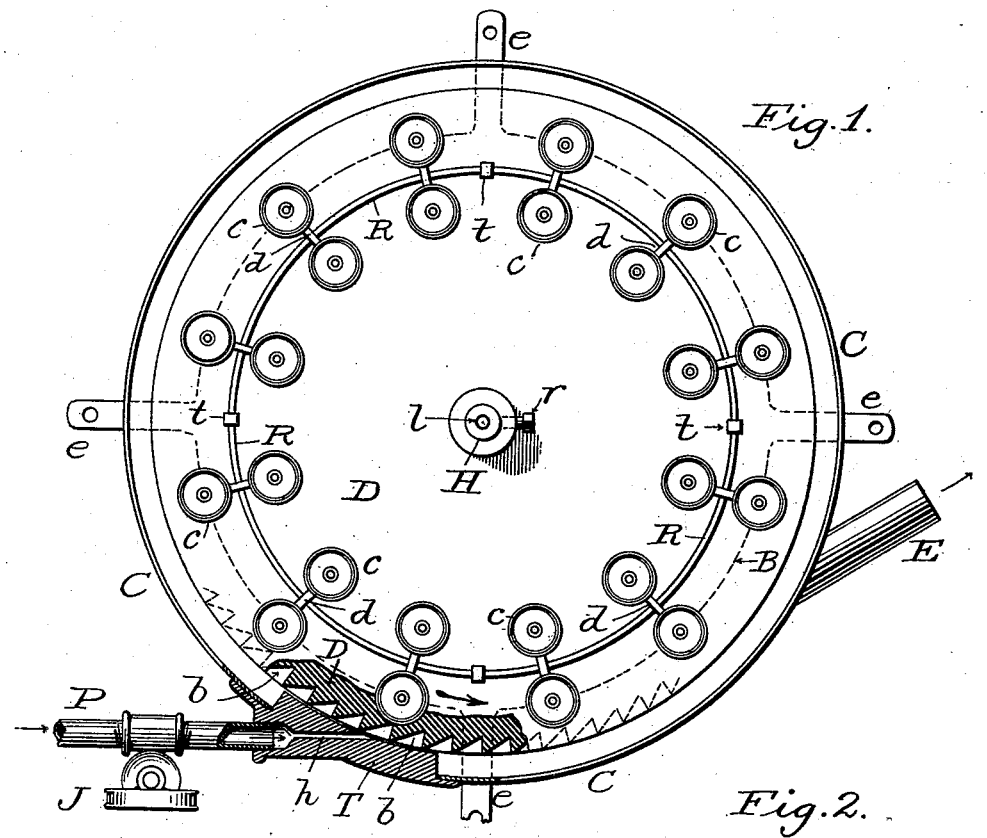
Figure 2:
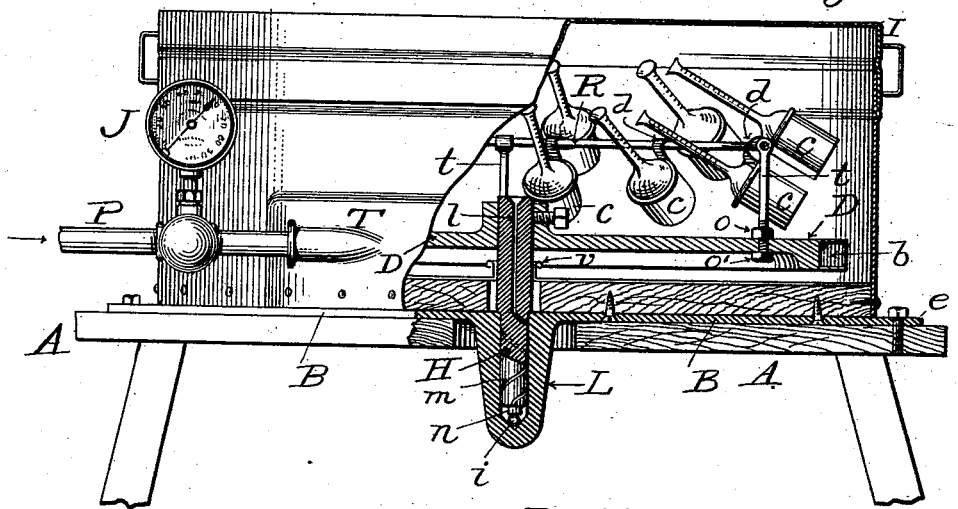

Figure 1 is a top plan view with the cover removed, and a portion shown in section; and Fig. 2 is a side elevation, partly in section, to more fully illustrate the construction.

Since the manufacture of butter and cheese has been reduced to a science and is carried on in factories built especially for the purpose, it has been ascertained that milk from different herds, and from different cows in the same herd, varies greatly in the proportion which each contains of butter fat and other solids which give it value in the production of butter and cheese, and for that reason it is now customary to vary the price paid for milk in proportion as its quality varies in these respects.

In order to determine the quality of the milk, various methods have been adopted, that now generally used being known as the "Babcock test," which consists in mixing an equal quantity or volume of the milk, and of sulphuric acid of 1.82 specific gravity, and after thoroughly mixing the same, subjecting it to a rotary motion in a machine made for the purpose, and using hot water to melt the fat of the milk so it will separate and rise to the top of the test bottle in which the mixture is held while being treated, these bottles being provided with a long neck having graduations marked thereon, by which the percentage of the fat can be at once read off.

The object of my present invention is to produce a machine of simple construction that can be operated by steam, and the steam at the same time be utilized to melt the fat in the milk. To accomplish these results, I first provide a base or support, which may be of any suitable construction, that shown being made in the form of a strong wooden bench A, having four legs to raise it to a convenient height, care being taken to make it strong and solid so as to prevent vibration. Upon this bench or base I bolt a metal disk B, shown in side view in Fig. 2, and in plan by dotted line in Fig. 1, it being provided with arms $e$ by which it is bolted fast to the bench. At its center this disk has a depending projection L, which projects downward through a hole in the bench, as shown in Fig. 2, it being bored out to form a bearing for the spindle H of a rotating disk or wheel D, as shown in Fig. 2, and hereinafter described. Upon the disk B is secured a metal case C, which has a wooden bottom inserted in a recess from below, and fastened to the case around its edge, and to the disk B by screws passing through the disk from below into the wooden bottom above. At the center of the bottom a hole is made for the spindle, and around the same is a raised flange $v$, as shown in Fig. 2, to prevent the water formed by condensation of the steam from running out at that point. Inside of this case I locate the disk or wheel D, which, as shown in Fig. 1, is provided on its periphery with a continuous series of recesses or buckets $b$, which consist of V-shaped recesses formed in the vertical face of wheel D with a flange at top and bottom of said recesses so as to confine the steam therein and at one side of the case I secure a metal block T, the inner face of which is formed concave or in the arc of a circle corresponding with that of the wheel and set close to the periphery of the wheel D, and concentric therewith, as shown in Fig. 1. Through this block T a small hole $h$ is bored diagonally, so that the jet of steam which passes through this hole will strike the shorter wall of the buckets with full force and thus impart to the disk D a rapid rotary motion. The journal or spindle H to which this wheel is secured has a hole $l$ drilled centrally from its top down to a point where it rests within the bearing L, where said hole unites with one bored diagonally inward from one side, and from the mouth of which latter a groove $m$ is cut spirally to the lower end of the spindle, so that oil placed in said hole will work gradually down and keep the spindle and its bearing thoroughly lubricated, the oil being retained in the box or bearing, from which it cannot escape, so that it is only necessary to remove the spindle at long intervals, as the oil becomes thickened or gummy, and clean it.

In the bottom of the bearing I place a case-hardened steel ball $i$, as shown in Fig. 2, and in the bottom of the spindle I insert a hardened steel step $n$, which rests upon the ball, thereby greatly reducing the friction. When the point of contact on the ball becomes worn, it is only necessary to remove the disk and its spindle and turn the ball sufficiently to present a new point of contact or bearing, the conical recess at the bottom of the bearing serving to hold the ball in position and prevent it from rolling or turning over while the machine is in operation. Upon this rotating disk or wheel I mount a ring R to support and carry the cups in which the test bottles are placed, as shown in Figs. 1 and 2, this ring being held by metal posts or rods $t$ which are provided with a screw thread to receive two nuts $o$ and $o'$, one above and the other below the disk, so that the ring can be adjusted to a perfectly horizontal position, as is necessary to insure the steady and even running of the wheel with its load. I then provide a series of cups $c$ of the proper size to receive and hold the test bottles, and connect them in pairs by a loop $d$, so that each pair can be hung separately upon the ring R, as shown in Figs. 1 and 2.

The case C is provided with a cover I by which it can be closed while in operation, and at one side it is provided with a pipe E for the escape of the steam from the case, and which pipe may be extended to the outside of the building or to a condenser, as desired.

In order to secure a proper and uniform speed of rotation, I attach to the steam supply pipe P, a steam gage J, as shown in Fig. 2, and apply to the wheel D a speed indicator, and turn on the steam until the required speed is attained, and which of course will vary with machines of different sizes. When the requisite speed is attained, it is only necessary to observe the pressure indicated by the gage, when the speed indicator can be removed, and thereafter in use it is only necessary to use the steam at the pressure indicated to secure the required speed. This testing of the various machines for speed, is of course done at the factory, and thereafter parties using them need only to apply the steam at the specified pressure.

It is of course obvious that instead of the wooden bench, the base or support may be made of iron, and be cast solid with or bolted to the disk B, the latter being made sufficiently thick to give it the requisite strength and solidity, and less in diameter. So too, it is obvious that both the disk B and the wheel D may be made in the form of a ring with arms and a central hub, and operate the same.

The operation is as follows, viz: The milk and acid are both measured and poured into the test bottles, which are then shaken by hand until thoroughly mixed. The bottles thus filled are then set in the cups $c$ and the latter hung upon the ring R, the cover put on, and the steam turned on, and continued for about ten minutes. The rapid rotation causes the cups with their bottles to assume an angle of about forty-five degrees, as represented in Fig. 2. The steam escaping from the buckets of the wheel fills the case, thus raising the temperature sufficiently to melt the fat in the milk, which being of less specific gravity than the residue of the milk, rises to the top, in the graduated necks of the bottles, where, as it is readily distinguishable from the remaining contents of the bottle, the percentage of the butter fat can be read off and recorded.

The advantages of this machine over those operated by hand power and using hot water to melt the butter fat, are obvious, more especially as butter and cheese factories use steam.

I am aware that milk testers have been patented in which a steam jet is shown as the means for causing the rotation, and in which steam was used for heating the milk, and therefore I do not claim such broadly; but Having fully described my invention, what I claim is—

1. The combination in a milk tester, of the case having the segmental plate T secured to one side with a passage $h$ for the admission of steam, and the wheel D provided on its periphery with the perpendicular faced buckets having a flange at top and bottom for confining the steam at the point of admission, substantially as shown and described.

2. In combination with the case and the rotary disk mounted on the shaft H, the metallic plate B provided with the central hollow pendant L to form a bearing for the shaft of the disk, and arms $e$ for securing it in place, substantially as shown and described.

3. The bottle holders $c$, $c$, connected by a loop or bail, in combination with the rod R, substantially as shown and described, whereby the bottle holders are rendered free to swing in all directions.

In witness whereof I hereunto set my hand in the presence of two witnesses.

DAVID W. CURTIS.

Witnesses:
H. H. CURTIS,
W. W. CORNISH.